Patented Oct. 17, 1933

1,930,883

UNITED STATES PATENT OFFICE 1,930,883

PROCESS FOR THE MANUFACTURE OF FERTILIZERS

Hermann Oehme, Cologne-Kalk, and Ernst Herrmuth, Cologne-Deutz, Germany, assignors to Chemische Fabrik Kalk Gesellschtf mit beschrankter Haftung, Cologne-Kalk, Germany No Drawing. Application June 22, 1931, Serial No. 546,152, and in Germany June 27, 1930

27 Claims. (Cl. 71—9)

Our invention relates to the manufacture of fertilizing materials, and more particularly a mixed fertilizer containing calcium phosphate and nitrogen.

In the treatment of superphosphate or similar mineral acid decomposition products of the raw phosphates with concentrated ammonia particularly in counter-current operations very high temperatures are developed. These high temperatures adversely affect the solubility of the calcium phosphates produced, or in other words, reduce their fertilizing value, and on the other hand the steam generated owing to the high temperatures leads to great mechanical difficulties in carrying out the reactions on a manufacturing scale, if the steam condenses on the walls of the apparatus or, in case of the counter-current process, the cold mineral acid decomposition products move over towards the reaction zone. These mechanical difficulties consist in the formation of lumps and incrustations on the apparatus, and the like. Due to this formation of lumps an irregular and poor absorption of the ammonia also takes place.

In order to eliminate these difficulties and, above all, to obtain products of definite properties as regards solubility of the calcium phosphates generated in an ammonia citrate solution, which has a pH-value equal to 6, it has already been proposed to carry out the process in a continuous counter-current with dilute ammonia gas.

We have now found, that in carrying out the reaction of superphosphate or similar decomposition products with dilute ammonia, more particularly if the dilution is carried to such an extent, as to maintain low temperatures during the reaction which highly favor the solubility of the calcium phosphates, the absorption of ammonia becomes insufficient, so that the reaction product obtained is only partly saturated with ammonia.

The reactions between the decomposed raw phosphates with ammonia may take place in the following manner:

(1) $H_3PO_4 + 2NH_3 = (NH_4)_2HPO_4$.
(2) $Ca(H_2PO_4)_2 + 2NH_3 = Ca(NH_4HPO_4)_2$. or $CaHPO_4 + (NH_4)_2HPO_4$.
(3) $Ca(NH_4HPO_4)_2 + 2NH_3 = Ca.(NH_4)_4.(PO_4)_2$.
(4) $3CaHPO_4 + 2NH_3 = Ca_3(PO_4)_2 + (NH_4)_2HPO_4$.
(5a) $2CaHPO_4 + CaSO_4 + 2NH_3 = Ca_3(PO_4)_2 + (NH_4)_2SO_4$.
(5b) $2CaHPO_4 + Ca(NO_3)_2 + 2NH_3 = Ca_3(PO_4)_2 + 2NH_4NO_3$.
(6) $(NH_4)_2HPO_4 + CaSO_4 = CaHPO_4 + (NH_4)_2SO_4$.

In the reaction with dilute ammonia only the reactions 1 and 2 take place, as a rule. Experience has shown that the further reactions call for the presence of certain quantities of water. If by the application of dilute ammonia and due to the rise in the temperature which takes place also when working with dilute ammonia the superphosphate or a similar mineral acid decomposition product has become excessively dry, the absorption of ammonia only amounts to from 20 to 25 per cent by weight of the $P_2O_5$ content, whereas upon full saturation with ammonia the content of nitrogen amounts to from 45 to 46 per cent by weight of the phosphoric acid. With dilute ammonia alone the full nitrogen absorption cannot be obtained if the product is not maintained very moist, so that either the nitrogen content of the finished product is rather low and the storage capacity suffers, or it is necessary to carry out a special drying process.

On the other hand fully saturated products are obtained if the first reaction phase, in which in the main the above described reactions 1 and 2 take place, is carried out with dilute ammonia and if the reactions 3 to 6 necessary for the full saturation, which take place with a lower development of heat, are completed with concentrated ammonia which is applied in the gaseous or liquid state. By concentrated ammonia 100 per cent ammonia gas is not necessarily understood since it suffices and it may even be of advantage if the ammonia supplied as 100 per cent of gas or liquid is diluted from 20 to 40 per cent intentionally or accidentally, for instance, by leakage in the apparatus employed. On the other hand it is possible to work with 40-100 per cent ammonia. In this way it is possible to attain the result that the conversion of the mineral acid phosphate decomposition products with ammonia can be carried out with ammonia also on a large scale at temperatures which do not substantially exceed 20 to 50 degrees centigrade, and, furthermore, a considerable acceleration of these reactions takes place by the application of concentrated ammonia for carrying through the reactions 3 to 6, as compared with dilute ammonia.

In the conversion of the phosphate decomposition products with diluted ammonia it may happen that either by the application of particularly dry decomposition products or by a very strong dilution of the ammonia gas, or by high temperatures of the air of dilution, for instance in summer, the products of reaction become very dry during the conversion with the dilute ammonia. In this case not any or a very small quantity of ammonia is absorbed even during the subsequent treatment with the concentrated ammonia. The reactions 3 to 6 necessary for the full saturation take place in the presence of certain quantities of water only, which, as we have ascertained, must amount to at least 5 per cent of the weight of the reaction product. The presence of water is probably necessary, on the one hand, to enable the ammonia to dissolve, on the other hand the chemical conversion processes necessary for the complete conversion also require the presence of water.

The necessary content of water for the reaction with concentrated ammonia in a quantity of at least 5 per cent may be attained by employing decomposition products which are sufficiently moist from the beginning. If, for instance, a normal superphosphate contains about 12 per cent of water (dried at 110 degrees), a superphosphate with 16 per cent of water may be used instead. It is, however, also possible to proceed in such a manner that corresponding quantities are added to the products of decomposition at one or a plurality of points either prior to the reaction or during the reaction with dilute ammonia, so that on the entry into the reaction zone with concentrated ammonia the reaction product still contains at least 5 per cent of water.

On the other hand the water may be added on entry into the reaction zone with concentrated ammonia or in this zone itself applied at one place or distributed over a plurality of places. The quantity of water will naturally be chosen as small as possible so that dry, high percentage products capable of being strewn on the soil are directly obtained. The quantity of water should, in any case, amount to at least 5 per cent of the weight of the decomposition mass, even if added only during the reaction with concentrated ammonia. The addition of water may naturally also be applied during the reaction with dilute and concentrated ammonia. The necessary addition of certain quantities of water renders it possible to employ this water for the dissolution of ammonia or fertilizer salts or for dissolving both simultaneously. It has already been proposed to convert superphosphate with accurately measured quantities of an aqueous 25 per cent ammonia solution, so that products are obtained in which half of the phosphoric acid exists in a water-soluble form and the other half in a citrate-soluble form. Such products are obtained if only so much ammonia is employed that the previously described reactions 1 and 2 take place. On the other hand the reactions should just be avoided which are necessary for the full saturation of the phosphate decomposition products and for the sake of which the supply of special quantities of water is required. In consequence thereof mixed fertilizers of different qualities are produced even if in both cases perfectly similar quantities of fertilizer salts are added, because the phosphoric acid is present in different forms of solubility, while on the other hand it carries from the beginning more than double the quantity of nitrogen as compared with the known process. Proposals according to which raw phosphates are decomposed with nitric acid in liquid phase and ammonia is introduced into the liquid under a stirring action, have likewise nothing to do with the present process.

The following may serve as examples:

*Example 1*

Into a rotary tube two feet in diameter and 23 feet in length 240 kgs. of superphosphate per hour are fed, which by the introduction of 4 per cent of water is brought to a total water content of 16 per cent, and is treated in counter-current with a 5 per cent ammonia gas. The maximum temperature at the admission end amounts to 50° C., at the discharge end to 18° C. The product contains:

$\left.\begin{array}{l}17{,}7\ \%\ \text{total}\ P_2O_5\\ 5{,}49\%\ \text{chemically fixed nitrogen}\end{array}\right\} = 30{,}9\%\ \text{total}\ P_2O_5$ The material discharged is made to traverse a second rotary tube and is treated therein with 33 per cent ammonia gas. We then obtain:

$\left.\begin{array}{l}17{,}7\%\ \text{total}\ P_2O_5\\ 2{,}4\%\ \text{water soluble}\ P_2O_5\end{array}\right\} = 89{,}9\%\ \text{total}\ P_2O_5$ $\left.\begin{array}{l}13{,}44\%\ \text{Petermann soluble}\ P_2O_5\\ 6{,}98\%\ \text{fixed nitrogen}\end{array}\right\} = 39{,}4\%\ \text{total}\ P_2O_5$

*Example 2*

In the above described rotary tube 210 kgs. of superphosphate (18% $P_2O_5$) are treated with a 6 per cent ammonia gas. The highest temperature at the admission end amounts to 54° C., the lowest temperature at the discharge end 22° C. The product contains:

$\left.\begin{array}{l}19{,}5\ \%\ \text{total}\ P_2O_5\\ 6{,}85\%\ \text{water-soluble}\ P_2O_5\end{array}\right\} = 93{,}6\%\ \text{total}\ P_2O_5$ $\left.\begin{array}{l}11{,}46\%\ \text{Petermann soluble}\ P_2O_5\\ 4{,}87\%\ \text{fixed nitrogen}\end{array}\right\} = 24{,}9\%\ \text{total}\ P_2O_5$ The discharged material is mixed in a rotary drum under cooling action at a temperature not exceeding 33° C. with a 30 per cent ammonia solution. A product is obtained of:

$\left.\begin{array}{l}16{,}75\%\ \text{total}\ P_2O_5\\ 0{,}98\%\ \text{water soluble}\ P_2O_5\end{array}\right\} = 92{,}6\%\ \text{total}\ P_2O_5$ $\left.\begin{array}{l}14{,}52\%\ \text{Petermann soluble}\ P_2O_5\\ 6{,}94\%\ \text{fixed nitrogen}\end{array}\right\} = 41{,}4\%\ \text{total}\ P_2O_5$

*Example 3*

In the rotary tube described above is introduced 300 kgs. of superphosphate per hour and treated with a 4,5 per cent ammonia gas in the first one third part of this tube according to the counter-current process. During the further progress of the material partly saturated with the dilute ammonia gas (nitrogen absorption about 22 per cent of the total $P_2O_5$) the material is moistened by a spraying nozzle, and treated during its further travel through the remaining part of the tube up to the discharge end of the tube in counter-current with a 20 per cent ammonia gas. In this way a material is obtained which contains:

$\left.\begin{array}{l}17{,}20\%\ \text{total}\ P_2O_5\\ 1{,}32\%\ \text{water soluble}\ P_2O_5\end{array}\right\} = 97{,}56\%\ \text{total}\ P_2O_5$ $\left.\begin{array}{l}15{,}46\%\ \text{Petermann soluble}\ P_2O_5\\ 7{,}19\%\ \text{fixed nitrogen}\end{array}\right\} = 41{,}7\ \%\ \text{total}\ P_2O_5$ Instead of 20 or 30 per cent ammonia 50 or 60 per cent or still more highly concentrated ammonia may also be employed in the phase 2, external cooling being preferably applied in the phase 2 whereby a still higher saturation with nitrogen up to 44 or 45 per cent is attained.

*Example 4*

In a reaction drum of 47½ feet length and 6½ feet diameter, which is so subdivided that for a length of 26¼ to 29½ feet dilute ammonia gas and for the remaining length of 16 to 19 feet concentrated ammonia gas can be introduced, 3000 kgs. of superphosphate (18,7% $P_2O_5$) are treated in the dilute zone with 6000 cbm. of a mixture of air with 3,5 per cent of ammonia and in the concentrated zone with 400 cbm. of a mixture of 50 per cent of ammonia and air. The ammonia may be introduced either in the gaseous or in the liquid state. The superphosphate travels in counter-current towards the ammonia. Simultaneously 70 litres of water finely atomized in the dilute zone at four points uniformly speed through the length of the zone. At the point of admission into the concentrated zone the material half saturated with ammonia is furthermore again moistened with 50 litres of water per hour in fine distribution. The material produced contains 17,5% total $P_2O_5$, of which 98 per cent is soluble in 2 per cent citric acid, and 7,5 per cent of nitrogen.

*Example 5*

Into the rotary tube 2 feet in diameter and 23 feet in length there are introduced every hour: 460 kgs. of a powdery decomposition product mass of raw phosphate with nitric acid in the presence of potassium sulphate, which contains: 10% $P_2O_5$, 18,5% $K_2O$ and 5,2% nitre nitgrogen. This mass is for ½ of the length of the tube treated with a 4 per cent ammonia gas diluted with air, and on the second half of the length of the tube with a 65 per cent ammonia gas diluted with air, external cooling being applied to the second half of the tube. The reaction product obtained contains: 9,2% $P_2O_5$, 9,6% nitgrogen and 18,0% $K_2O$.

The above examples are to be rated relatively only, because it is also possible to displace the ratio of the absorbed quantity of ammonia in the phase in which it is dilute, and in the phase in which concentrated ammonia is used in relation to each other. Under concentrated ammonia may also be understood liquefied or gaseous 100% ammonia.

It is pointed out that by the expression "liquid ammonia" a liquefied ammonia is to be understood and not a liquid aqueous ammonia solution.

We claim as our invention:—

1. The process of producing a mixed fertilizer containing calcium phosphate and nitrogen by the treatment of non-liquid mineral acid decomposition products of the raw phosphates with ammonia, which comprises first treating the products of decomposition of the raw phosphates with dilute ammonia gas, and then treating the products with concentrated ammonia gas, said decomposition products being sufficiently moist so that the reaction product still contains at least 5% of water during the reaction with the concentrated ammonia.

2. The process of producing a mixed fertilizer containing calcium phosphate and nitrogen by the treatment of non-liquid mineral acid decomposition products of the raw phosphates with ammonia, which comprises first treating the products of decomposition of the raw phosphates with dilute ammonia gas, adding a quantity of water to the products, and then treating the products with concentrated ammonia gas while maintaining the products sufficiently moist by the addition of water so that the reaction product still contains at least 5% water during the reaction.

3. The process of producing a mixed fertilizer containing calcium phosphate and nitrogen by the treatment of non-liquid mineral acid decomposition products of the raw phosphates with ammonia, which comprises first treating the products of decomposition of the raw phosphates with dilute ammonia gas, and then treating the products with concentrated ammonia gas and at the same time adding quantities of water to maintain the products sufficiently moist so that the reaction product still contains at least 5% water.

4. The process of producing a mixed fertilizer containing calcium phosphate and nitrogen, by the treatment of non-liquid mineral acid decomposition products of the raw phosphates with ammonia, which comprises first treating the products of decomposition of the raw phosphates with dilute ammonia gas and in continuation thereof with concentrated ammonia gas, and at the same time introducing a quantity of water during the reaction with the dilute and concentrated ammonia so that the reaction product contains at least 5% water during the reaction with the concentrated ammonia whereby after the saturation with ammonia a mixed fertilizer capable of being strewn on the soil is obtained.

5. In a process of producing a mixed fertilizer containing calcium phosphate and nitrogen, by the treatment of non-liquid mineral acid decomposition products of the raw phosphates with ammonia, first treating the products of decomposition of the raw phosphates with dilute and then with concentrated ammonia, at the same time introducing water during the reaction of such quantity that on complete or substantially complete saturation with ammonia a directly strewable mixed fertilizer is produced.

6. A process according to claim 5, in which the water is added to the dilute ammonia.

7. A process according to claim 5, in which the water is added to the concentrated ammonia.

8. The process of producing a mixed fertilizer containing calcium phosphate and nitrogen by the treatment of non-liquid mineral acid decomposition products of the raw phosphates with ammonia, which comprises first treating the products of decomposition of the raw phosphates with dilute liquid ammonia, and then treating the products with concentrated liquid ammonia, said decomposition products being sufficiently moist so that the reaction product still contains at least 5% of water during the reaction with the concentrated ammonia.

9. The process of producing a mixed fertilizer containing calcium phosphate and nitrogen by the treatment of non-liquid mineral acid decomposition products of the raw phosphates with ammonia, which comprises first treating the products of decomposition of the raw phosphates with dilute ammonia gas, and then treating the products with concentrated liquid ammonia, said decomposition products being sufficiently moist so that the reaction product still contains at least 5% of water during the reaction with the concentrated ammonia.

10. The process of producing a mixed fertilizer containing calcium phosphate and nitrogen, by the treatment of non-liquid mineral acid decomposition products of the raw phosphates with ammonia, which comprises first treating the products of decomposition of the raw phosphates with dilute liquid ammonia and in continuation thereof with concentrated liquid ammonia, and at the same time introducing a quantity of water during the reaction with the dilute and concentrated ammonia so that the reaction product contains at least 5% water during the reaction with the concentrated ammonia whereby after the saturation with ammonia a mixed fertilizer capable of being strewn on the soil is obtained.

11. The process of producing a mixed fertilizer containing calcium phosphate and nitrogen, by the treatment of non-liquid mineral acid decomposition products of the raw phosphates with ammonia, which comprises first treating the products of decomposition of the raw phosphates with dilute ammonia gas and in continuation thereof with concentrated liquid ammonia, and at the same time introducing a quantity of water during the reaction with the dilute and concentrated ammonia so that the reaction product contains at least 5% water during the reaction with the concentrated ammonia whereby after the saturation with ammonia a mixed fertilizer capable of being strewn on the soil is obtained.

12. A process according to claim 5, in which the dilute ammonia is in a gaseous state and the concentrated ammonia in liquid form.

13. The process of producing a mixed fertilizer containing calcium phosphate and nitrogen by the treatment of non-liquid mineral acid decomposition products of the raw phosphates with ammonia, which comprises treating the products of decomposition of the raw phosphates with liquid dilute ammonia, and then treating the products with concentrated liquid ammonia, said decomposition products being sufficiently moist so that after saturation with ammonia a mixed fertilizer, capable of being strewn on the soil, is obtained.

14. The process of producing a mixed fertilizer containing calcium phosphate and nitrogen by the treatment of non-liquid mineral acid decomposition products of the raw phosphates with ammonia, which comprises treating the products of decomposition of the raw phosphates with liquid dilute ammonia, and then treating the products with concentrated liquid ammonia, said decomposition products being sufficiently moist by the addition of water, which is added during the treatment with the dilute ammonia, so that the reaction product still contains at least 5% of water during the reaction with the concentrated ammonia.

15. The process of producing a mixed fertilizer containing calcium phosphate and nitrogen by the treatment of non-liquid mineral acid decomposition products of the raw phosphates with ammonia, which comprises treating the products of decomposition of the raw phosphates with liquid dilute ammonia, and then treating the products with concentrated liquid ammonia while maintaining the products sufficiently moist by the addition of water during the treatment with the concentrated ammonia so that the reaction product still contains at least 5% of water during the reaction with concentrated ammonia.

16. The process of producing a mixed fertilizer containing calcium phosphate and nitrogen by the treatment of non-liquid mineral acid decomposition products of the raw phosphates with ammonia, which comprises treating the products of decomposition of the raw phosphates with liquid dilute ammonia, and then treating the products with concentrated ammonia gas, said decomposition products being sufficiently moist by the addition of water during the treatment with the concentrated ammonia so that the reaction product still contains at least 5% of water during the reaction.

17. The process of producing a mixed fertilizer containing calcium phosphate and nitrogen by the treatment of non-liquid mineral acid decomposition products of the raw phosphates with ammonia, which comprises treating the products of decomposition of the raw phosphates with liquid dilute ammonia, and then treating the products with concentrated liquid ammonia, at the same time introducing water during the treatment with the dilute ammonia so that on complete saturation with ammonia a directly strewable mixed fertilizer is produced.

18. The process of producing a mixed fertilizer containing calcium phosphate and nitrogen by the treatment of non-liquid mineral acid decomposition products of the raw phosphates with ammonia, which comprises treating the products of decomposition with liquid dilute ammonia, and then treating the products with concentrated liquid ammonia, and at the same time introducing a quantity of water during the reaction with the dilute amonia so that on saturation with ammonia a directly strewable mixed fertilizer is produced.

19. The process of producing a mixed fertilizer containing calcium phosphate and nitrogen by the treatment of non-liquid mineral acid decomposition products of the raw phosphates with ammonia, which comprises treating the products of decomposition of the raw phosphates with dilute ammonia gas, and then treating the products with concentrated liquid ammonia, said decomposition products being sufficiently moist so that after saturation with ammonia a mixed fertilizer, capable of being strewn on the soil, is obtained.

20. The process of producing a mixed fertilizer containing calcium phosphate and nitrogen by the treatment of non-liquid mineral acid decomposition products of the raw phosphates with ammonia, which comprises treating the products of decomposition of the raw phosphates with dilute ammonia gas, and then treating the products with concentrated ammonia liquid, said decomposition products being maintained sufficiently moist by the addition of water so that the reaction product still contains at least 5% of water during the reaction with the dilute ammonia gas.

21. The process of producing a mixed fertilizer containing calcium phosphate and nitrogen by the treatment of non-liquid mineral acid decomposition products of the raw phosphates with ammonia, which comprises treating the products of decomposition of the raw phosphates with dilute ammonia gas, and then treating the products with concentrated liquid ammonia, said decomposition products being maintained sufficiently moist by the addition of water so that the reaction product still contains at least 5% of water during the reaction with the concentrated liquid ammonia.

22. The process of producing a mixed fertilizer containing calcium phosphate and nitrogen by the treatment of non-liquid mineral acid decomposition products of the raw phosphates with ammonia, which comprises treating the products of decomposition of the raw phosphates with dilute ammonia gas, and then treating the products with concentrated liquid ammonia while maintaining the product sufficiently moist by the addition of water so that the reaction product still contains at least 5% of water during the reaction with the dilute ammonia gas.

23. The process of producing a mixed fertilizer containing calcium phosphate and nitrogen by the treatment of non-liquid mineral acid decomposition products of the raw phosphates with ammonia, which comprises treating the products of decomposition of the raw phosphates with dilute ammonia gas, and then treating the products with concentrated liquid ammonia, while maintaining the product sufficiently moist by the addition of water so that the reaction product still contains at least 5% of water during the reaction with the concentrated liquid ammonia.

24. The process of producing a mixed fertilizer containing calcium phosphate and nitrogen by the treatment of non-liquid mineral acid decomposition products of the raw phosphates with ammonia, which comprises treating the products of decomposition of the raw phosphates with dilute liquid ammonia, and then treating the products with concentrated ammonia gas while maintaining the product sufficiently moist by the addition of water so that the reaction product still contains at least 5% of water during the reaction with the dilute liquid ammonia.

25. The process of producing a mixed fertilizer containing calcium phosphate and nitrogen by the treatment of non-liquid mineral acid decomposition products of the raw phosphates with ammonia, which comprises treating the products of decomposition of the raw phosphates with dilute liquid ammonia, and then treating the products with concentrated ammonia gas while maintaining the product sufficiently moist by the addition of water so that the reaction product still contains at least 5% of water during the reaction with the concentrated ammonia gas.

26. The process of producing a mixed fertilizer containing calcium phosphate and nitrogen by the treatment of non-liquid mineral acid decomposition products of the raw phosphates with ammonia, which comprises treating the products of decomposition of the raw phosphates with dilute liquid ammonia, and then treating the products with concentrated ammonia gas while maintaining the products sufficiently moist by the addition of water so that the reaction product still contains at least 5% of water during the reaction with the dilute liquid ammonia.

27. The process of producing a mixed fertilizer containing calcium phosphate and nitrogen by the treatment of non-liquid mineral acid decomposition products of the raw phosphates with ammonia, which comprises treating the products of decomposition of the raw phosphates with dilute liquid ammonia, and then treating the products with concentrated ammonia gas while maintaining the product sufficiently moist by the addition of water so that the reaction product still contains at least 5% of water during the reaction with the concentrated ammonia gas.

HERMANN OEHME.
ERNST HERRMUTH.